United States Patent [19]

Rogan

[11] 4,076,043

[45] Feb. 28, 1978

[54] HIGH FATIGUE STRENGTH CHECK VALVE

[75] Inventor: John Rogan, Greenford, England

[73] Assignee: Dart Industries Inc., Los Angeles, Calif.

[21] Appl. No.: 701,923

[22] Filed: Jul. 1, 1976

[51] Int. Cl.² .......................................... F16K 15/04
[52] U.S. Cl. ................................................ 137/539.5
[58] Field of Search ................... 137/515, 515.7, 539, 137/539.5, 540

[56] References Cited

U.S. PATENT DOCUMENTS

| | | | |
|---|---|---|---|
| 1,275,697 | 8/1918 | Joyce | 137/540 X |
| 2,274,968 | 3/1942 | O'Bannon | 137/515.7 |
| 2,307,949 | 1/1943 | Phillips | 137/539 X |
| 3,095,900 | 7/1963 | Newhall | 137/515.7 X |

FOREIGN PATENT DOCUMENTS

| 1,391,887 | 4/1975 | United Kingdom | 137/539.5 |

Primary Examiner—William R. Cline

Attorney, Agent, or Firm—Arthur S. Collins; Bryant W. Brennan; Fred S. Valles

[57] ABSTRACT

A ball type check valve is provided featuring a simple rugged structure which can be easily fabricated and finished to have excellent fatigue strength and resistance to the stresses of continually repeating pressure fluctuations. The key to the success of this valve is the basic monobloc body used therein. Thus, one single compact body block is fashioned with a longitudinal opening extending therethrough, the median portion of which is a smooth cylindrical bore designed to house the ball stop, biasing spring and associated movable valve parts while the approach sections of the opening leading thereto from either end are of larger cross-section. The valve is then completed by incorporating upstream and downstream tail pieces enclosed within said approach sections and held in end to end direct contact sealing relationship with annular shoulder areas at either end of said median portion by means of suitable back-up attachment devices engaged with said body block.

9 Claims, 2 Drawing Figures

HIGH FATIGUE STRENGTH CHECK VALVE

BACKGROUND OF THE INVENTION

This invention relates to ball type check valves of simple rugged construction offering dependable operation and durability even under severe high pressure service conditions. The valves of this invention are outstanding in their resistance to fatigue cracking and related structural failures when used in systems exposed to the stresses of cyclic pressure variations, such as are generated by reciprocating compressors, plunger type intensifier pumps and the like.

Ball type check valves are widely employed in order to stop the back flow of fluids in a wide variety of devices and systems. However, none of the multitude of individual designs which have previously been devised has provided satisfactory service life under exposure to severe stress cycles from repeated sharp pressure fluctuations. Such repeated stress cycles can cause fatigue cracks to develop at any point or area of weakness. However, most such failures occur at or near various edges of other sharply defined changes in geometrical shape or surface, such as threaded segments and recessed seats or stepped shoulder portions, particularly within the valve body proper and associated parts which are directly exposed to full fluid pressure The primary object of the present invention is to provide a simple ball stop check valve which performs reliably in high pressure fluids service with exceptional structural longevity and freedom from fatigue failures. A related object is to compose the valve from a limited number of primary component parts having simple compact shapes which can be readily fabricated with all inner surfaces, seats and sealing areas readily accessible for finishing to high pressure stress resistant condition.

Another object is to reduce maintenance costs by providing a check valve which is not only durable in high pressure fluid systems but which is also assembled in a direct, positive and easy manner so as to assure convenient access to all parts for economical servicing.

Still other objects and advantages of the invention will become apparent from the following details thereof.

DETAILED DESCRIPTION

The above objects and advantages have been achieved by building the check valve from a main body block having a longitudinal opening extending therethrough the medium portion of which is a smooth cylindrical bore sized to accommodate the ball stop and associated moving parts in an appropriate sliding fit but being of smaller cross-section than any of the communicating sections from either end of said body block, which thus provide easy access to the interior of the valve. This easy accessability of the inner-most cylindrical bore within the valve body permits it to be properly finished by honing, hardening, autofrettaging or whatever may be required to provide fatigue resistance equal to intended service conditions.

Likewise, inner portions of each of the two communicating sections from either end of said body block may readily be finished as a counter bored cylindrical well providing a substantially flat annular shoulder on either side of said innermost bore. Simply shaped and smoothly finished, fatigue resistant tail pieces (generally cylindrical) can then be slip-fitted into these respective wells on either side of said inner bore and, by means of suitable externally engaged back-up attaching devices, forced into a direct and positive compression seal with appropriate mating areas on said flat annular shoulders in said wells. Each tail piece, of course, is made with a substantially straight fluid passageway extending longitudinally therethrough. The valve construction is completed by shaping the inner end of the fluid passageway in the upstream tail piece so that it forms a seat for the ball stop of the valve and using the inner end of the downstream tail piece as a base support for the cooperating biasing spring.

From this general explanation it will be seen that the check valve of this invention is ideally suited for use under demanding service conditions because all of the basic components actually exposed to full fluid pressure are simply shaped, smoothly contoured elements which can be easily and economically fabricated to high standards of quality.

Figure 1:
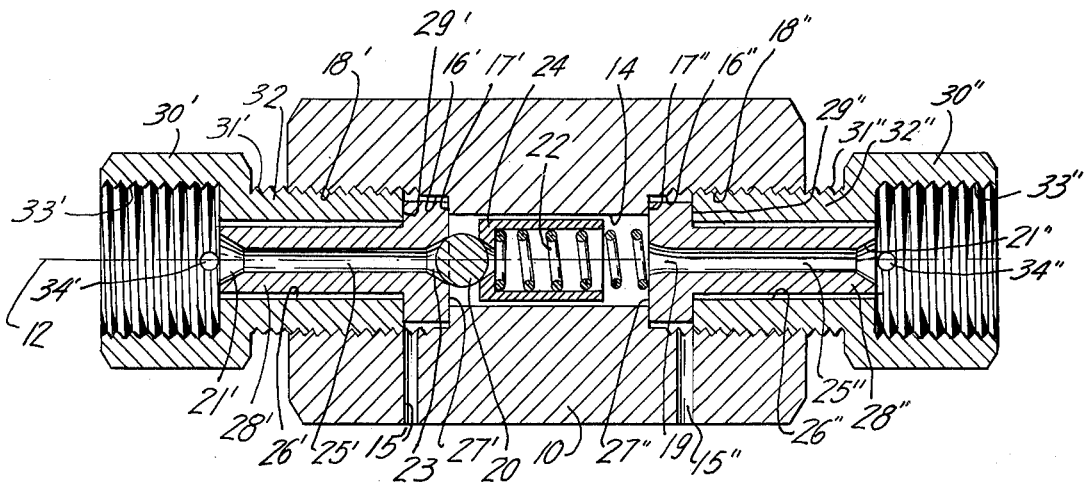
Figure 2:
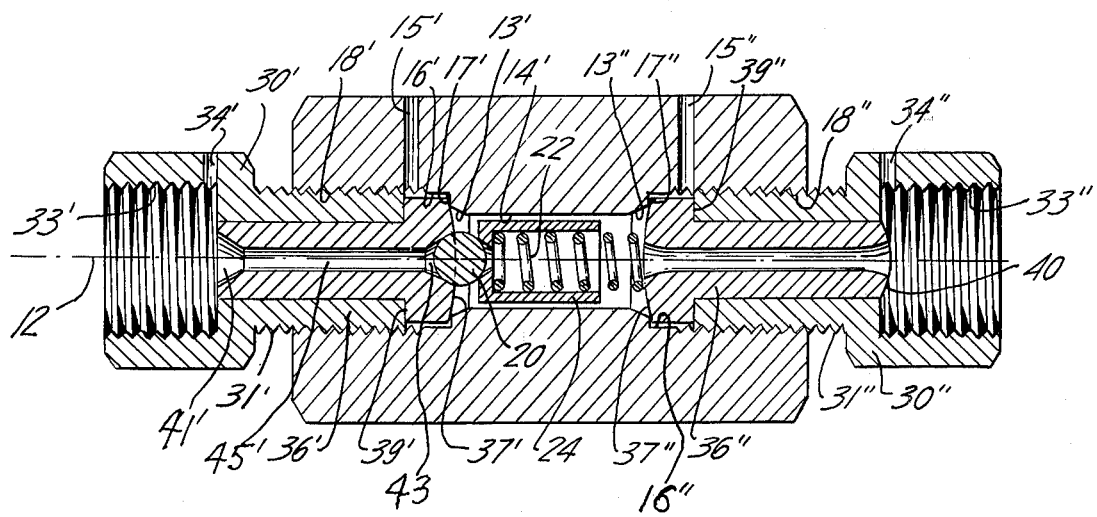

In order to provide a fuller understanding of the present invention and the relationships involved in producing practical operating units for certain critical applications, more detailed description will now be given of presently preferred embodiments of my check valve assembly. In presenting these detailed description, reference is now made to the accompanying drawings, wherein:

FIG. 1 is a sectional view along a plane through the longitudinal axis of one check valve assembly made in accordance with this invention in which provision is made for direct connection to standardized high pressure tubing at the outer ends of both tail pieces; and FIG. 2 is a comparable sectional view of another similar valve assembly in which certain elements are shaped somewhat differently, particularly with respect to sealing areas thereon.

Referring now to FIG. 1, the main body 10 of the valve is formed from a solid continous block of any convenient symmetrical cross-section, such as square, round or hexagonal, with a through opening running concentrically along axis 12. The median portion of said through opening is a uniform smooth bore 14 of smaller cross-section than any of the remaining portions of said through opening. Smooth bore 14 is specifically sized to house the movable parts of the valve, namely ball 20, biasing spring 22 and spring guide 24.

Portions of said through opening adjacent to each end of smooth bore 14 are counter bored and smoothly finished to form wells 16' and 16" terminating in substantially flat annular shoulders 17' and 17" projecting substantially normal to axis 12. Wells 16' and 16" are sized to receive the enlarged head portions of tail pieces 26' and 26", the faces 27' and 27" of which are shaped to seal directly against shoulders 17' and 17" when under firm contacting force. Said contacting force is applied by external back-up attachment members 30' and 30" having collet shaped extensions 32' and 32" which fit around the sleeve-like bodies 28' and 28" of said tail pieces and bear upon annular shoulders 29' and 29" on the back side of said enlarged head portion. Said collet shaped extensions are preferably externally threaded at 31' and 31" so they can be engaged with matching internally threaded sections 18' and 18" of the through opening in main body 10 to provide said firm contacting force.

Tail pieces 26' and 26" have fluid passageways 25' and 25" running through same in an axial direction. The outer portions 21' and 21" of these fluid passageways 25' and 25" each has a frustoconical shape adapted mating with the seal cone of a high pressure tubing fitting (not shown) by threading associated back-up nuts (not shown) into threaded recesses 33' and 33". The inner portion 23 of fluid passageway 25' is flared precisely to form a seal for ball 24, while inner portion 19 of fluid passage 25' flares only slightly so as to leave on tail piece 26" a flat face area to support the base of spring 22.

Small bleed holes leading to the outside atmosphere are provided at the base of all female threaded sections of the valve assembly, namely holes 34' and 34" in threaded recesses 33' and 33", and holes 15' and 15" at the base of internally threaded sections 18' and 18" of the main body. In this way, fluid pressure build-up in these parts is prevented should leakage ever occur at any of the direct contact sealing areas at either end of the tail pieces 26' and 26". Thus, it will be seen that the only parts of the valve assembly of FIG. 1 which are exposed to direct fluid pressure are tail pieces 26' and 26" and smooth uniform bore 14 in the median section of main body 10.

Referring next to FIG. 2, another ball check valve assembly is shown having a very similar overall arrangement of component parts but illustrating some alternative shapes in the main sealing areas, especially of the tail pieces. Once again the main body 10 of the valve has a through opening running concentrically along its axis 12. Also, the ball 20, biasing spring 22 and spring guide 24 are again slidably housed in the median part of said through opening. However, in FIG. 2, said median part of this through opening is comprised of a main uniform smooth bore 14' with short outwardly tapering frustoconical sections 13' and 13" at either end. Smoothly finished counterbored wells 16' and 16" (sized to receive the enlarged head portions of tail pieces 36' and 36") thus abut short tapered sections 13' and 13" respectively providing substantially flat annular shoulders 17' and 17". In order to assure a more positive high pressure seal against shoulders 17' and 17", the faces 37' and 37" of said enlarged head portions of tail pieces 36' and 36" protrude slightly in a substantially spherical contour or convex lens shape. Therefore, as externally threaded back-up attachment members 30' and 30" are engaged with matching internally threaded sections 18' and 36" applying end-wise thrust to tail pieces 36' and 36" by way of annular shoulders 39' and 39", a localized circumferential line of sealing contact is secured between each of shoulders 17' and 17" and the adjacent tail piece faces 37' and 37" respectively.

The fluid passageway 45' in upstream tail piece 36' has a frustoconical section at each end, namely inner section 43 to form a sealing area for ball stop 22 and outer section 41' for mating with a high pressure tubing fitting (not shown). However, downstream tail piece 36" has only a slightly tapered section at each end, so that the direct contact sealing at its downstream end is located on end face 40. The exact shape of end face 40 can be varied from essentially flat to that of wide-angled frustoconical nose preferably, as shown in FIG. 2, having an angle of incline of at least about 10° from a perfectly flat or squared off plane normal to axis 12. This permits a good direct contact seal to be made between face 40 and an adjoining fitting having a similar bluntly convex or nearly flat mating surface with contact being secured by means of a suitable back-up nut engaging threaded recess 33". This location of the direct contact sealing surface on the outer end face 40 of a tail piece has been found to improve its fatigue resistance dramatically under exposure to repeated cyclic pressure fluctuations of large magnitude.

The check valve assemblies described thus far represent presently preferred embodiments of my invention from the point of view of convenience of construction and assembly with assured service reliability. However, in addition to alternatives already mentioned, it will be obvious that certain other variations would be possible in arrangement, shape and fit of the cooperating components without detracting appreciably from the integrity and performance of the valve assembly of this invention.

For example, instead of engaging back-up attachment members 30' and 30" with the main valve body by means of threaded sections 18' and 18", these sections can merely be finished as smooth walled bores and the outer surfaces of collent shaped extensions 32' and 32" also smoothly finished to slide freely therein. The contacting force necessary to make positive seals between the various components of the valve assembly would then be created by a different engagement means between the back-up attachment members and the main valve body, such as by bolts drawing on a flange extension of the outer part of said back-up attachment members by being engaged into matching threaded bolt holes formed in the ends of said main valve body.

Likewise, with respect to FIG. 2, instead of having convex or protruding surface faces 37' and 37" on the enlarged head portions of tail pieces 36' and 36", these faces can be flat and substantially normal to the main axis of the valve assembly while shoulders 17' and 17" are tapered or contoured, thereby assuring again that the sealing force is uniformly applied and concentrated on a narrowly localized but concentric area of contact between respective components to make a positive seal.

having described my invention completely including presently preferred embodiments thereof, it is to be understood that all modification and variations thereof which are obvious to those skilled in the art are intended to be within the scope of the appended claims.

What is claimed is:

1. A ball-type valve assembly especially suited for service in high pressure fluid systems comprising
    a. a main body block having a longitudinal opening extending therethrough the median portion of which is a smooth cylindrical bore having a smaller cross-section than any of the remaining portions of said longitudinal opening and a portions of said longitudinal opening on either side of said media portion being in the form of a counter bored well of substantially larger cross-section then said median portion thus providing an annular shoulder adjacent either end of said smooth cylindrical bore,
    b. a ball stop, associated biasing spring element and movable guide member slidably housed within said median portion to permit limited axial movement of said ball stop between closed and open positions,
    c. an upstream and a downstream tail piece each having a fluid passageway extending therethrough along its longitudinal axis and an enlarged head portion fitting closely within the counter bored well on the respective side of said median portion, the face of each head portion being shaped to bear uniformly against a direct-contact sealing area on the annular shoulder adjacent thereto, the fluid passageway at the head end of the upstream tail piece being shaped to form a valve seal for said ball stop and the fluid passageway at the head end of the downstream tail piece being shaped so that part of the face portion thereof serves as a base support for said biasing spring element, the remainder of each of said tail pieces being formed as an elongated, sleeve-like body of substantially smaller cross-section than its head portion thus providing an annular shoulder on the back side of said head portion, and d. a back-up attaching device positively engagine with each end of said main body block and having a collet shaped extension thereon which fits around the sleeve-like body of the adjacent tail piece and bears upon the annular shoulder on the back side of said head portion so as to force the face thereof into good sealing contact with said sealing area on the annular shoulder adjacent thereto.

2. A ball-type check valve as described in claim 1 wherein each of said collet shaped extensions is externally threaded and each end of said longitudinal opening through said main body block is provided with matching internal threads by which each back-up attaching device positively engages with said main body block.

3. A ball-type check valve as defined in claim 1 wherein the face of the head portion on each tail piece is substantially planar.

4. A ball-type check valve as defined in claim 1 wherein the face of the head portion on each tail piece is shaped substantially as a wide angled conical surface.

5. A ball-type check valve as defined in claim 1 wherein the face of the head portion on each tail piece has a substantially spherical surface contour similar to that of a convex lens.

6. A ball-type check valve as defined in claim 1 wherein at the outer end of the upstream tail piece the fluid passageway therethrough is enlarged into an outwardly diverging frustoconical recess presenting a uniform sealing area therein while the passageway at the outer end of the downstream tail piece diverges less presenting a uniform sealing area on the outer end face thereof.

7. A ball-type check valve as described in claim 6 wherein said outer end face of said downstream tail piece is shaped as a wide-angled frustoconical nose having an angle of incline of at least 10° to a plane normal to the main axis of the valve assembly.

8. A ball-type check valve as defined in claim 1 wherein the length of each tail piece is greater than the respective counter bored well into which it fits so that the outer ends of both tail pieces extend well beyond the ends of said main body block.

9. A ball-type check valve as defined in claim 8 wherein at the outer end of each tail piece the fluid passageway there-through has an outwardly diverging conical shape adapted for mating with a seal cone of a high pressure tubing fitting and each back-up attaching device has an internally threaded recess in coaxial alignment with said fluid passageway for engagement with said high pressure tubing fitting.

* * * * *